US006408921B1

(12) United States Patent
Bonacini (10) Patent No.: US 6,408,921 B1
(45) Date of Patent: Jun. 25, 2002

(54) MULTIPURPOSE STATION FOR MOUNTING AND REMOVING CONVENTIONAL AND SPECIAL TIRES

(75) Inventor: Maurizio Bonacini, Correggio (IT)

(73) Assignee: Guiliano S.R.L., Correggio (IT)

( * ) Notice: Subject to any disclaimer, the term of this patent is extended or adjusted under 35 U.S.C. 154(b) by 0 days.

(21) Appl. No.: 09/570,833

(22) Filed: May 12, 2000

(30) Foreign Application Priority Data

May 14, 1999 (IT) ........................................ MO99A0098

(51) Int. Cl.[7] ............................................ B60C 25/135
(52) U.S. Cl. ...................... 157/1.24; 157/1.26; 157/1.46
(58) Field of Search ............................... 157/1.24, 1.26, 157/1.46

(56) References Cited

U.S. PATENT DOCUMENTS 5,215,138 A * 6/1993 Toriselli et al.
5,381,843 A * 1/1995 Corghi
5,758,703 A * 6/1998 Mimura

FOREIGN PATENT DOCUMENTS

EP      0 482 701    4/1992
FR      1 585 025    1/1970

* cited by examiner

Primary Examiner—Joseph J. Hail, III
Assistant Examiner—Willie Berry, Jr.
(74) Attorney, Agent, or Firm—Wolf, Greenfield & Sacks, P.C.

(57) ABSTRACT

The multipurpose station for mounting and removing conventional and special tires is constituted by a turret-type frame from the top vertex of which a horizontal guiding cross-member cantilevers out and by a carriage for supporting first and second devices for mounting and removing tires from their respective wheel rims, which is able to move back and forth on the cross-member, under the actuation of a corresponding actuator. The frame has, at a substantially median vertical elevation, conventional elements for rotatably supporting and clamping the wheels and has, in a downward region, a pusher which co-operates with the first and second mounting and removing devices and a lifting support for lifting the wheels towards the conventional supporting and clamping elements and for seating the mounted tires.

16 Claims, 10 Drawing Sheets

MULTIPURPOSE STATION FOR MOUNTING AND REMOVING CONVENTIONAL AND SPECIAL TIRES

BACKGROUND OF THE INVENTION

The present invention relates to a multipurpose station for mounting and removing conventional and special tires.

Conventional tire changing machines which can mount and remove both conventional and so-called special tires are currently in use.

The expression "special tires" designates innovative tires which one of the leading manufacturers is currently bringing to market and have the feature of not deflating completely in case of puncture, accordingly allowing to reach the nearest servicing and repair center without substantial difficulties.

These tires and their wheel rims provide a wheel which is absolutely safe even, as mentioned, in precarious conditions and essentially consist of a wheel rim having different outer and inner edge diameters, the latter being greater than the former; accordingly, the tires have the same feature and can therefore be fitted or removed only in one direction.

A ring made of elastomeric material of preset thickness is further fitted between the wheel rim and the tire and constitutes the element which, in case of tire deflation, prevents its complete collapse, with severe danger for vehicle users.

As a consequence of this variety of production by tire manufacturers, tire specialists are forced to purchase two different types of tire changing machine, one for each type of tire, or must improvise with unorthodox means in order to be able to use conventional machines designed for conventional tires, albeit in very precarious conditions and with loss of handiness and speed of use, by applying to these machines adapters which allow to work on special tires as well.

The prior art is substantially hindered not only by the above-mentioned problem but also by the fact that there is a tendency to constantly reduce the space required for work, with the consequent need to combine, as much as possible, the functions of a plurality of machines which are currently part of the standard equipment of tire specialists into a smaller and more practical number of devices.

SUMMARY OF THE INVENTION

The aim of the present invention is to solve the above-mentioned problems of the prior art by providing a multipurpose station for mounting and removing conventional and special tires which can, with a single machine, operate on both kinds of tires, thus eliminating the need to purchase two separate machines and significantly reducing the overall costs and space occupation.

This aim, this object and others are achieved by a multipurpose station for mounting and removing conventional and special tires, characterized in that it is constituted by a turret-type frame from the top vertex of which a horizontal guiding cross-member cantilevers out, a carriage for supporting first and second means for mounting and removing tires from their respective wheel rims being able to move back and forth on the cross-member, under the actuation of a corresponding actuator, the frame having, at a substantially median vertical elevation, conventional elements for rotatably supporting and clamping the wheels and having, in a downward region, pusher means which co-operate with said first and second mounting and removing means and lifting means for lifting the wheels towardss the conventional supporting and clamping means and for seating the mounted tires.

BRIEF DESCRIPTION OF THE DRAWINGS

Further characteristics and advantages will become apparent from the following detailed description of a preferred embodiment of a multipurpose station for mounting and removing conventional and special tires, illustrated only by way of non-limitative example in the accompanying drawings, wherein.

DESCRIPTION OF THE PREFERRED EMBODIMENTS

With reference to the above figures, 1 designates a multipurpose station for mounting and removing conventional and special tires 2.

The station 1 is constituted by a conventional turret-shaped frame 3, from the upper vertex of which a horizontal guiding cross-member 4 cantilevers out; a carriage 6 can move back and forth on this cross-member, under the actuation of a corresponding actuation means 5, and supports first and second means, designated by 7 and 8 respectively, for mounting and removing the tires 2 on and from the respective wheel rims 2a.

The frame 3 has, at a substantially median vertical elevation, conventional elements 9 for rotatably supporting and clamping the wheels and has, in a downward region, pusher means 10 which co-operate with these first and second mounting and removal means 7 and 8; the frame 3 also has, at its base, lifting means 11 adapted to lift the wheels towardss the conventional supporting and clamping elements 9 and for seating the tires 2 once they have been mounted.

The first mounting and removal means 7 are constituted by a substantially vertical rod 12 which is mounted so as to slide in a corresponding sleeve 13, which is in turn rigidly coupled to the carriage 6, and is actuated by means of its own fluid-driven actuator 14; it is possible to apply alternately to the lowest end of the rod 12 a pair of tools which can be correspondingly used on conventional or special tires 2: in detail, the tool meant for use on conventional tires 2 is constituted by a shaped support 15 which is articulated so that it can rotate at the lowest end of the rod 12 and on which a freely rotating plate 16 and an opposite-facing extractor claw 17 are fitted; the tool meant for use on special tires 2 is constituted by at least one roller 18 which is mounted so that it can rotate freely at the lowest end of the rod 12, coaxially thereto, for contact with the sidewall/bead region of the tires 2.

The rod 12 and the corresponding sleeve 13 have cross-sections which have a polygonal perimeter, so as to interpenetrate with a single degree of freedom.

The second fitting and removal means 8 are constituted by an arm 19 which is supported on the rod 12 proximate to its lowest end; the arm 19 is articulated so that it can rotate between an upward-facing inactive position and a downward-facing active position, and forms a curved portion 19a which, when it is arranged in said active configuration, is orientated towards said rotating support which constitutes the elements 9.

The arm 19 has, at its tip, a sleeve 20 in which a second rod 21 is slidingly mounted; a shaped element 22 for guiding the beads of the tires 2 during their mounting and removal is in turn rigidly fixed to the lowest end of the second rod.

The pusher means 10 are constituted by two free rollers 23 which are mounted in a parallel arrangement on corresponding stems 23a, each of which protrudes at right angles from a corresponding sleeve 24 which in turn is slidingly engaged on a horizontal guiding bar 25 which is parallel to the guiding cross-member 4 and also protrudes from the turret-type frame 3, below the elements 9; the sleeves 24 are rotationally connected to each other by means of the guiding bar 25 and there are also means 26 for adjusting their mutual spacing.

The guiding bar 25 has, at its free end, an articulated handle 27 or a fluid-driven actuator in order to produce the simultaneous rotation of the sleeves 24 and of the guiding bar 25 and the horizontal motion of at least one of the sleeves 24, specifically the one lying near it.

The means 26 for adjusting the spacing of the sleeves 24 are constituted by a plate 28 which is rigidly coupled to the handle 27 and protrudes from it so as to lie parallel to the guiding bar 25; the plate is affected by a series of aligned through sectors 29 in which a corresponding pin alternately engages; the pin protrudes from at least one of the sleeves 24, specifically the one lying nearest the handle 27.

The lifting means 11 are constituted by a horizontal platform 31 which is arranged below the elements 9, so as to be vertically aligned with the wheels fitted thereon, and can be moved vertically parallel to itself with a corresponding independent actuation unit 32; a cradle 33 is provided on the upper face of the platform 31 and its position can be slidingly adjusted horizontally on the platform 31; the cradle is used to support and retain the tires 2 and also apply seating pressure to them when their mounting on the wheel rims is completed.

The cradle 33 has, at its ends, respective parallel transverse rollers 34 which are freely supported between the side walls of the cradle in order to provide dynamic contact with the tires 2.

The turret-type frame 3 can optionally be provided with a lateral post 35 which is joined, at its upper and lower ends, respectively to the corresponding end of the guiding cross-member 4 and to the base of the frame 3; an auxiliary arm 36 is articulated to the post so as to rotate on a horizontal path and has, at its distal end with respect to the post, a tool 37 for guiding the beads of the tires 2 and an element 38 for centering when the tool 37 is in the active configuration.

In practice, the centering element 38 is constituted by a shaped receptacle 39 which is formed at the tip of the distal end of the auxiliary arm 36 and in which a complementarily shaped head 40 can be inserted snugly and coaxially; this head protrudes centrally from the conventional rotating shaft which composes the conventional elements 9 for the rotary support and clamping of the wheels; retention means are provided between the head 40 and the corresponding receptacle 39. These means are substantially constituted by a transverse guillotine 41 which can be inserted, through a corresponding through slot 42 formed in the end of the auxiliary arm 36, in a corresponding aligned groove 43 which is formed perimetrically for this purpose in the head 40.

The operation of the invention is described hereinafter separately for the mounting and removal of conventional and special tires.

In both cases, however, the placement of a wheel whose tire 2 is to be replaced is identical: the wheel is in fact placed on the platform 31, which is brought to ground level in advance, and is arranged so as to stand in the cradle 33; this cradle is first made to slide towardss the outside of the platform 31, which is raised so as to bring the central hole of the corresponding wheel to a position in which it is axially aligned with the supporting and rotation shaft of which the station 1 is conventionally provided and which constitutes, together with a centering cone and a clamping ring, the means 9.

Once alignment has been achieved, the cradle 33 is made to slide on the platform 31 towardss the turret-type frame 3 and the shaft of the station enters the hole of the wheel, which is then clamped in a conventional manner by means of the corresponding centering cone and ring.

If the tire is of the conventional type, the station 1 uses the first means 7.

Figure 8:
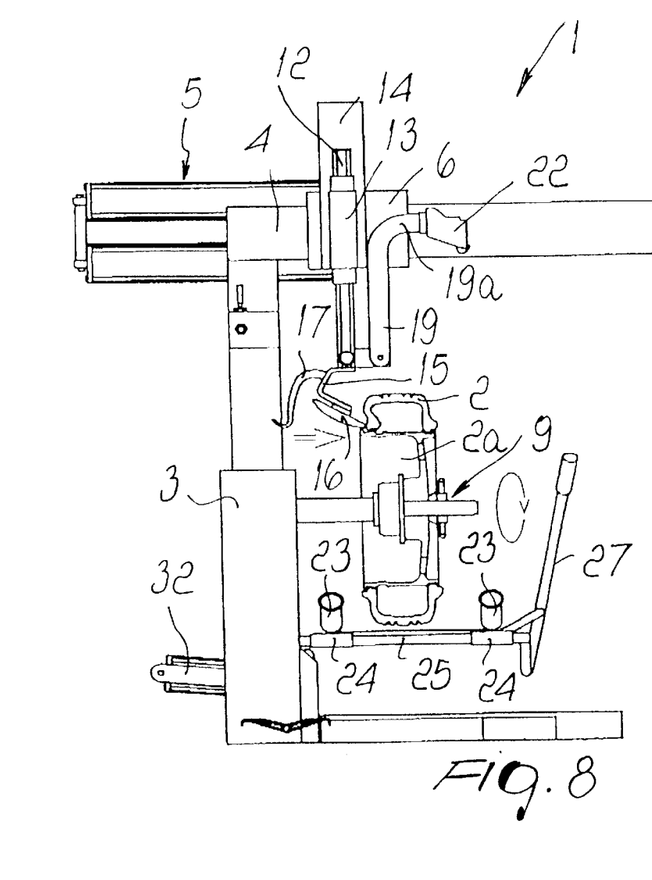
FIGS. 8 and 9 are views of the bilateral bead breaking of a tire by using a first mounting and removal means with which the station according to the invention is provided.
Figure 9:
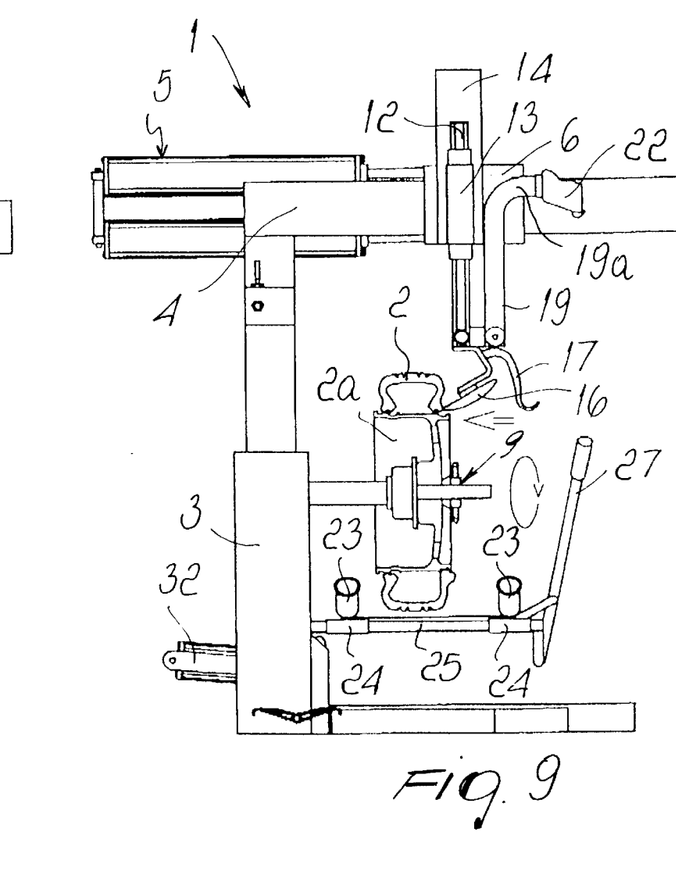
Figure 10:
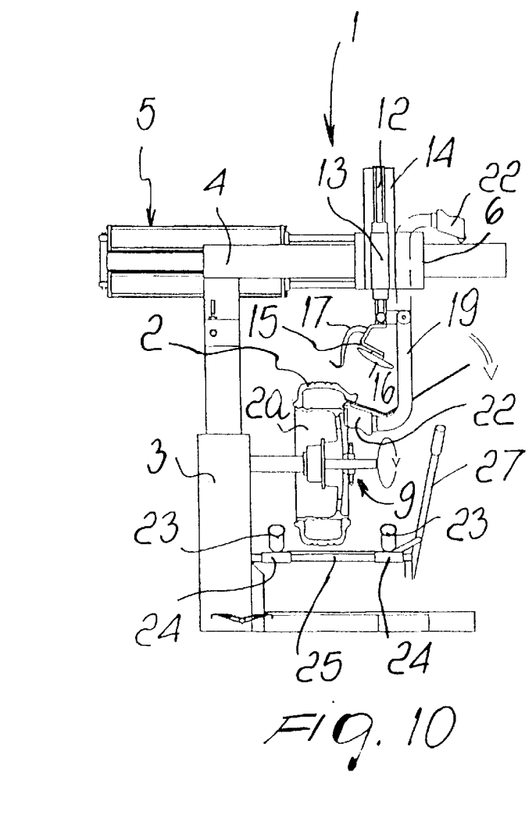
FIGS. 10, 11 and 12 are schematic views of three successive steps of the removal of a tire from the wheel rim by using a first mounting and removal means.

In practice, first of all the bead of the sidewalls of the tire 2 are broken away (see FIGS. 8 and 9) by pressing thereon with the plate 16 which presses and is actuated in a transverse direction by the actuation means 5, which in turn acts on the carriage 6, and by turning the wheel with the means 9.

Figure 11:
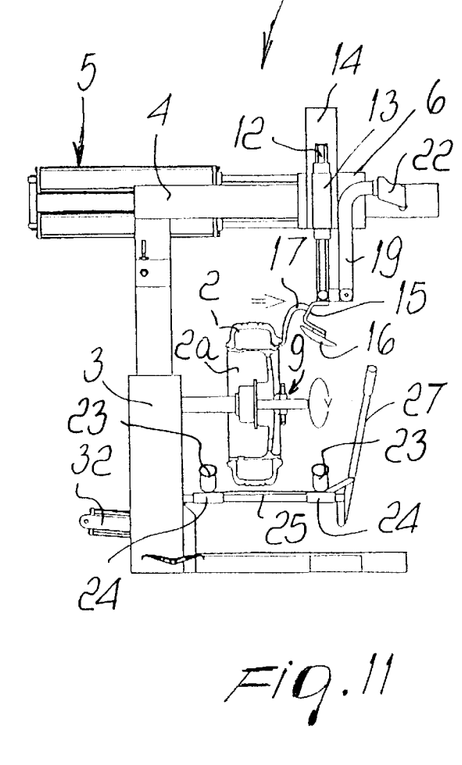
Figure 12:
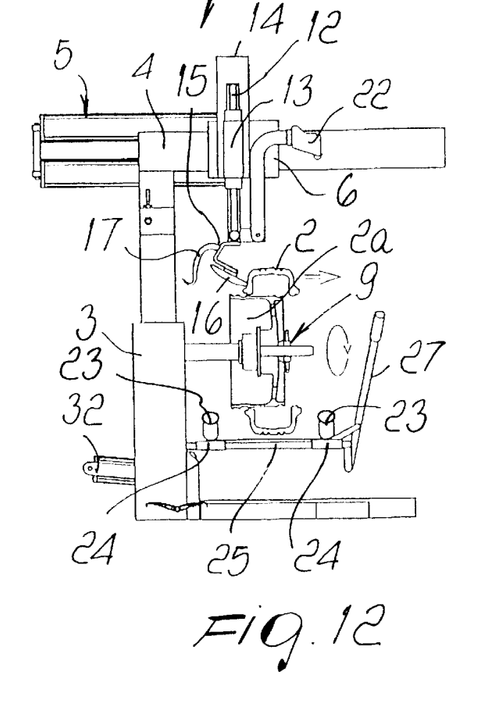

Bead breaking is performed bilaterally by turning the support 15 which is articulated to the lowest end of the rod 12, and when said bead breaking is complete, i.e. when the tire 2 is pushed towardss the central channel of the wheel rim and therefore is arranged loosely thereon, the support 15 is turned and the claw 17 is inserted between the beads and the wheel rim (FIG. 11), again turning the wheel with the means 9; this extracts the beads from the wheel rim and therefore allows to manually remove the tire 2 from the wheel rim.

For mounting (FIGS. 16 and 17), first of all one bead is fitted loosely on the wheel rim, and when it is fitted in the channel of the wheel rim the shaped element 22 connected to the arm 19 is used; this element is lowered for this purpose and the second bead of the tire 2 is forced, by turning the elements 9, to slide on said element 22, following its shape, which conveys the bead into the channel of the wheel rim.

Figures 16, 17:
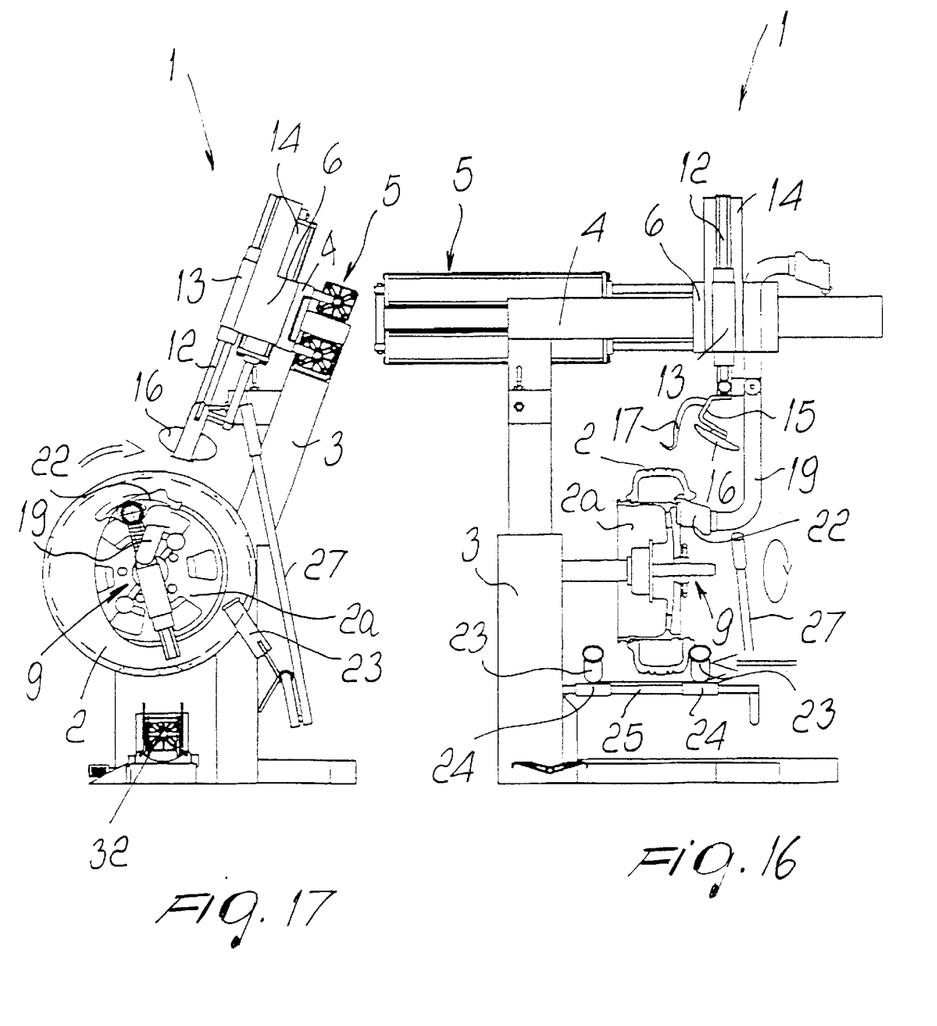
FIG. 16 is a view of the insertion of the bead of a conventional tire by using a second mounting and removal means.
FIG. 17 is a corresponding side view of FIG. 16.

During this operation, the free roller 23 which faces outwards is moved into forced contact with the lower portion of the tire by acting on the lever 27. By pushing on the lever, the sleeve 24 in fact slides on the bar 25 and moves the roller so as to maintain the contact in order to push the bead inside the edge of the wheel rim even from a position which is diametrically opposite with respect to the position of the element 22.

Figure 18:
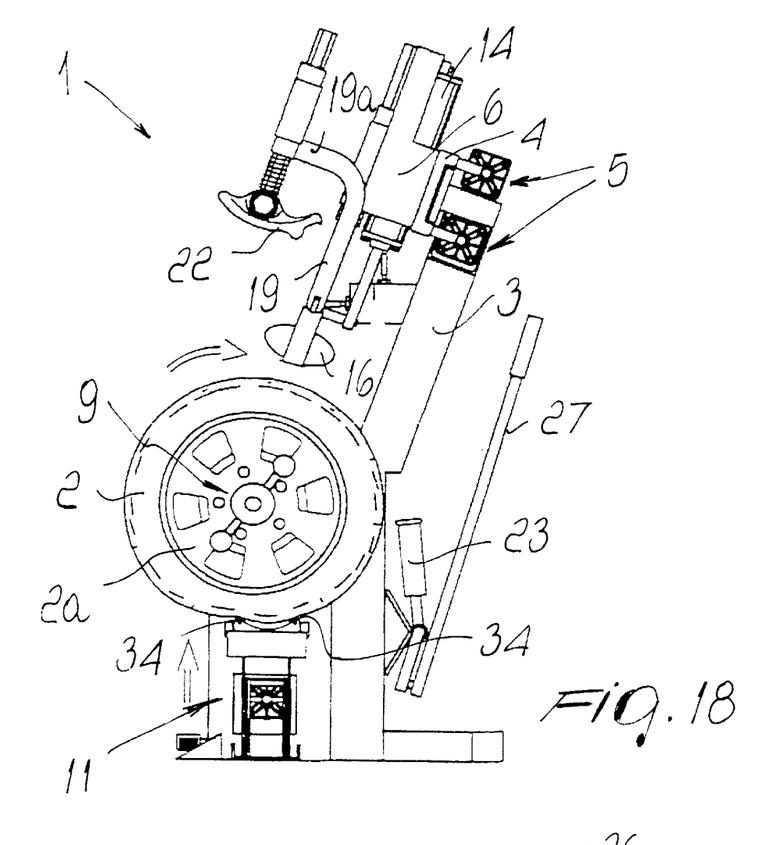
FIG. 18 is a view of a step of the seating of a tire which has just been mounted on its wheel rim.
Figure 19:
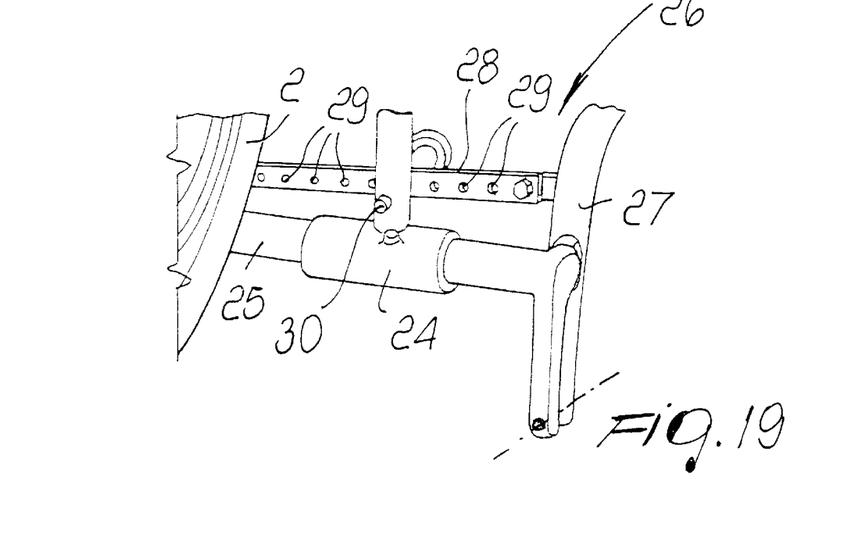
FIG. 19 is a view of a detail of a component of the pusher means.
Figure 20:
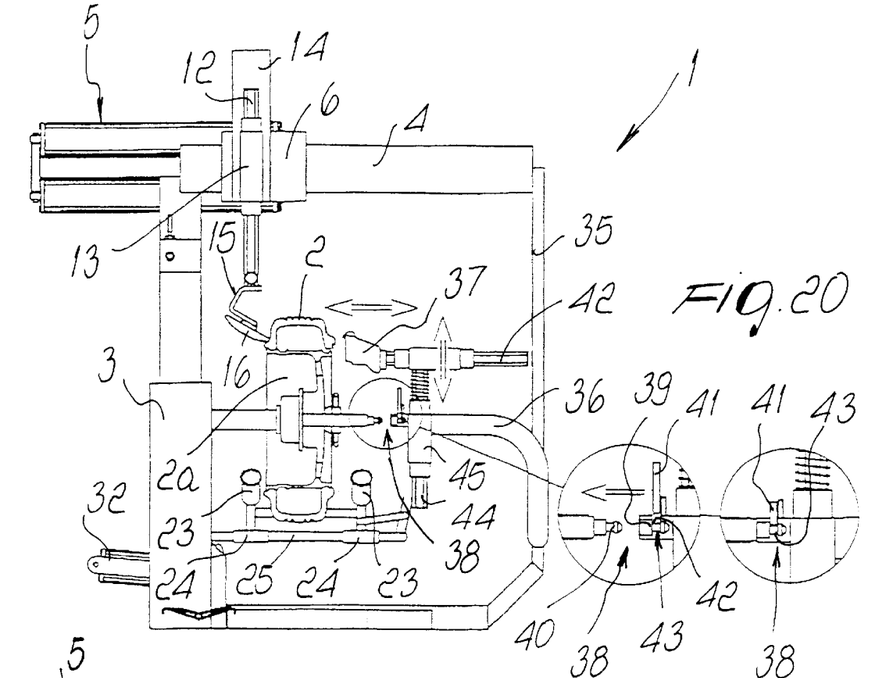
FIG. 20 is a front view of the station according to the invention, provided with an optional lateral post which supports an auxiliary arm which is provided with a tool for guiding the beads of the tires during their mounting and removal.
Figure 21:
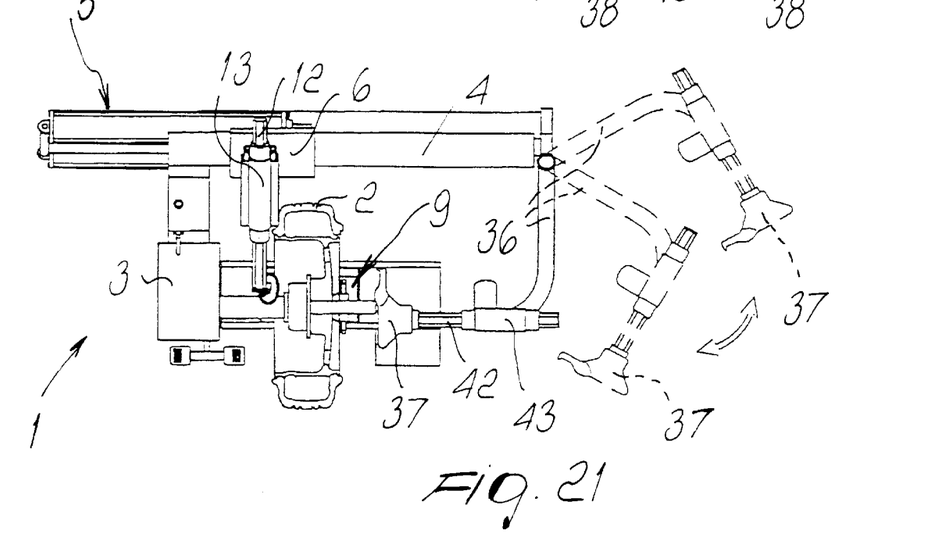
FIG. 21 is a corresponding top view of FIG. 20.
Figure 22:
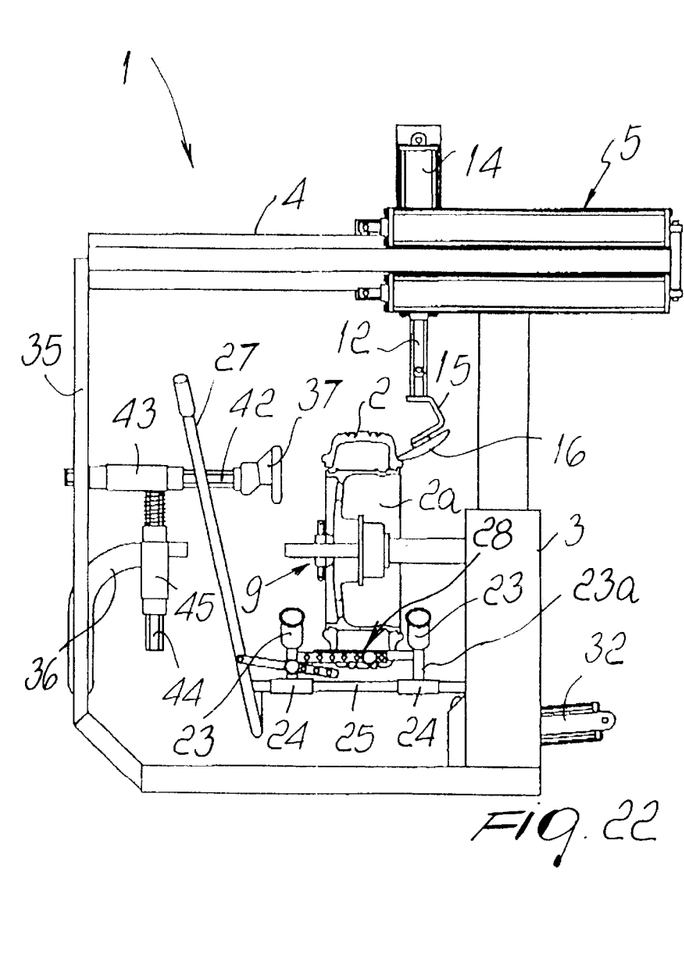
FIG. 22 is a rear view of the station provided with the post as in FIG. 20.
Figure 23:
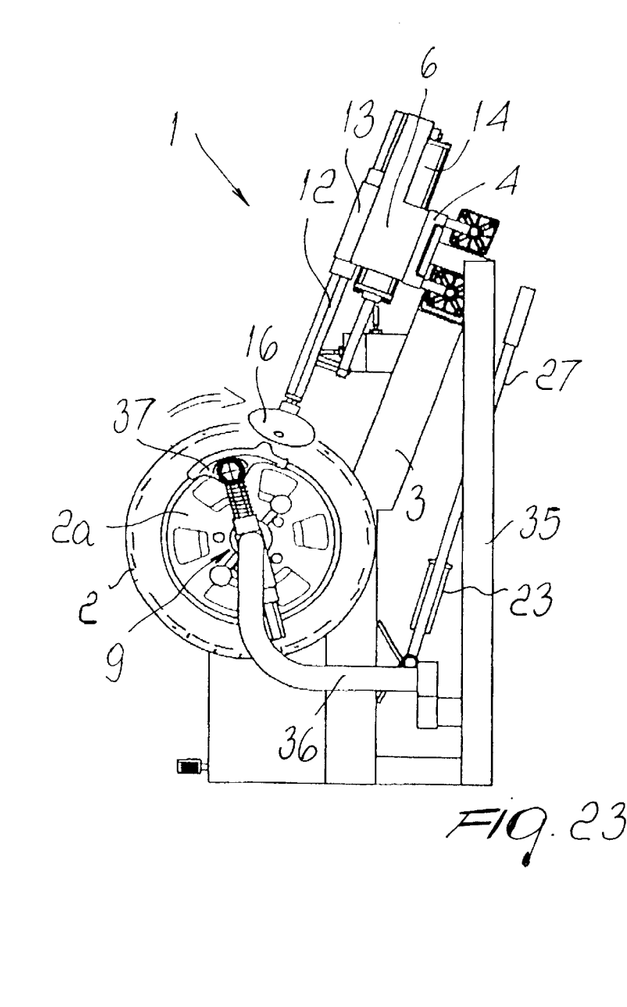
FIG. 23 is a corresponding side view of FIG. 22.

When the tire has been mounted, it is inflated to a pressure which is substantially equal to the normal operating pressure and the platform 31 is lifted in order to bring the rollers 34 into contact with the tread.

The wheel is turned again and the pressure applied by the rollers of the cradle 33 causes the final settling of the beads of the tire 2 on the sidewalls of the wheel rims.

The procedure is substantially similar for special tires 2.

However, the free roller 18 is fitted at the lowest end of the rod 12.

When the wheel is fitted on the clamping means or elements 9, in order to break the bead of the tire 2, which is appropriately deflated (FIG. 6), the roller 18 is moved into a position horizontally aligned with the beads by sliding the rod 12 in the sleeve 13.

Figure 1:
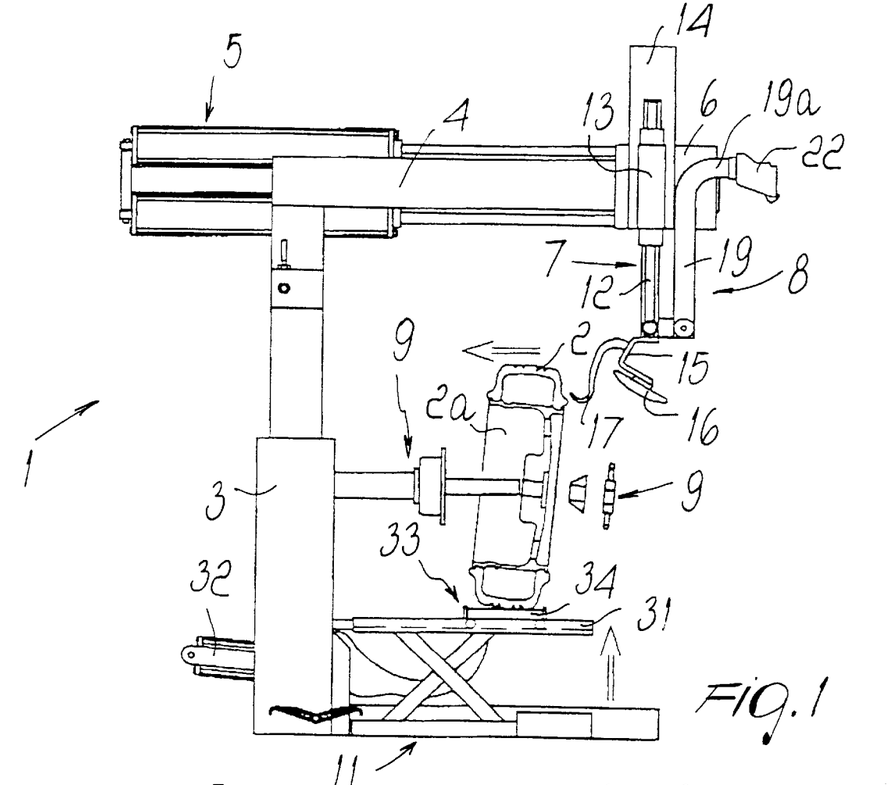
FIG. 1 is a schematic front view of the station according to the invention, in a step for positioning a wheel provide with a conventional tire for removal.
Figure 2:
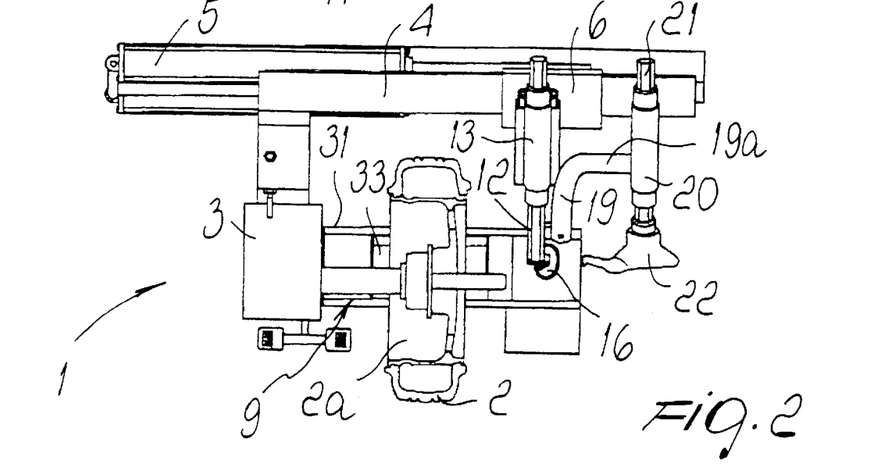
FIG. 2 is a corresponding top view of FIG. 1.
Figure 3:
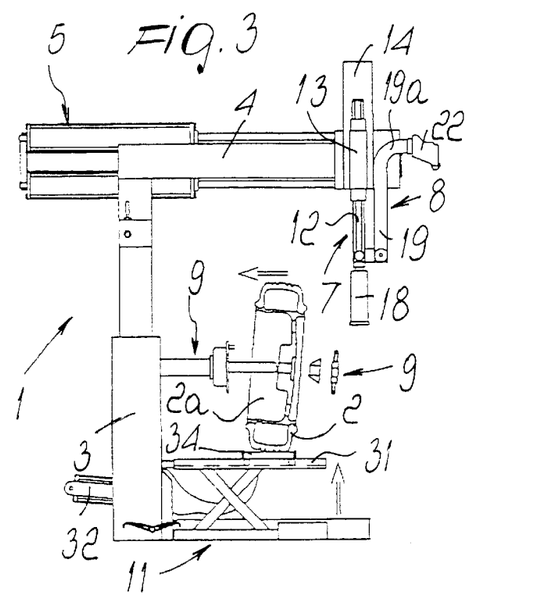
FIG. 3 is a schematic front view of the station according to the invention, in a step for positioning a wheel provided with a special tire.
Figure 4:
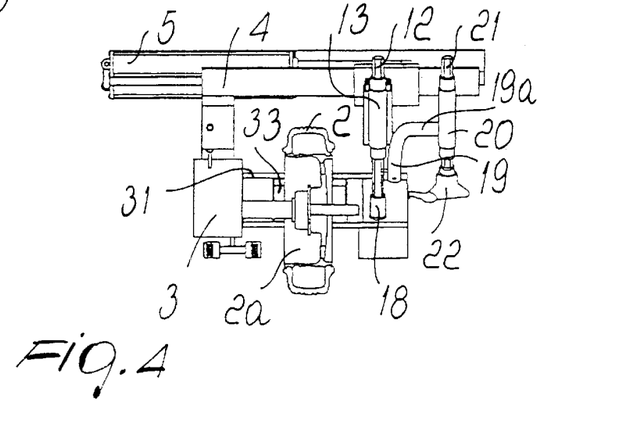
FIG. 4 is a corresponding top view of FIG. 3, with the wheel fully positioned.
Figure 5:
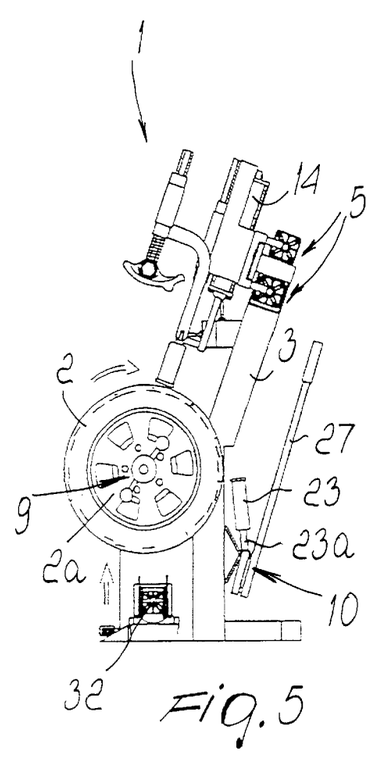
FIG. 5 is a corresponding side view of the station according to the invention, with the wheel provided with a special tire already fitted.
Figure 6:
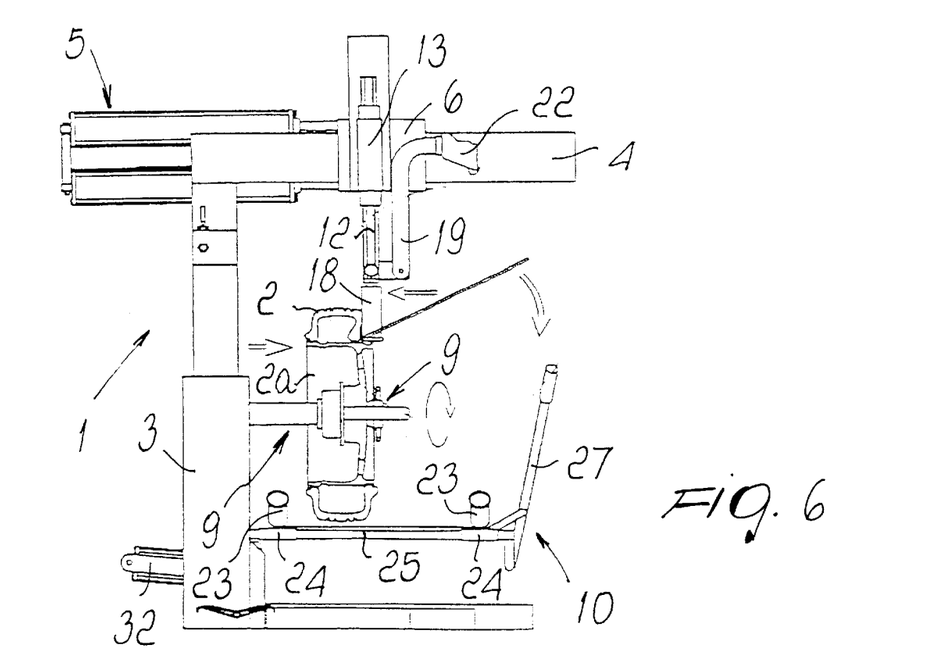
FIG. 6 is a view of a step for breaking away the bead of a sidewall of a tire mounted on a wheel which is clamped onto the station with the aid of levers.

Once this position has been reached, by making the carriage 6 slide on the cross-member 4 towardss the frame 3, in practice from the outside towardss the inside of the station 1, and by simultaneously rotating the means 9, the first bead is pushed towardss the internal channel of the wheel rim, in a position in which it is slightly loose.

The operator then grips a lever, which can be supplied separately or be a permanent part of the standard equipment and is arranged on said rod 12, and lifts the previously removed bead beyond the edge of the wheel rim.

Figure 7:
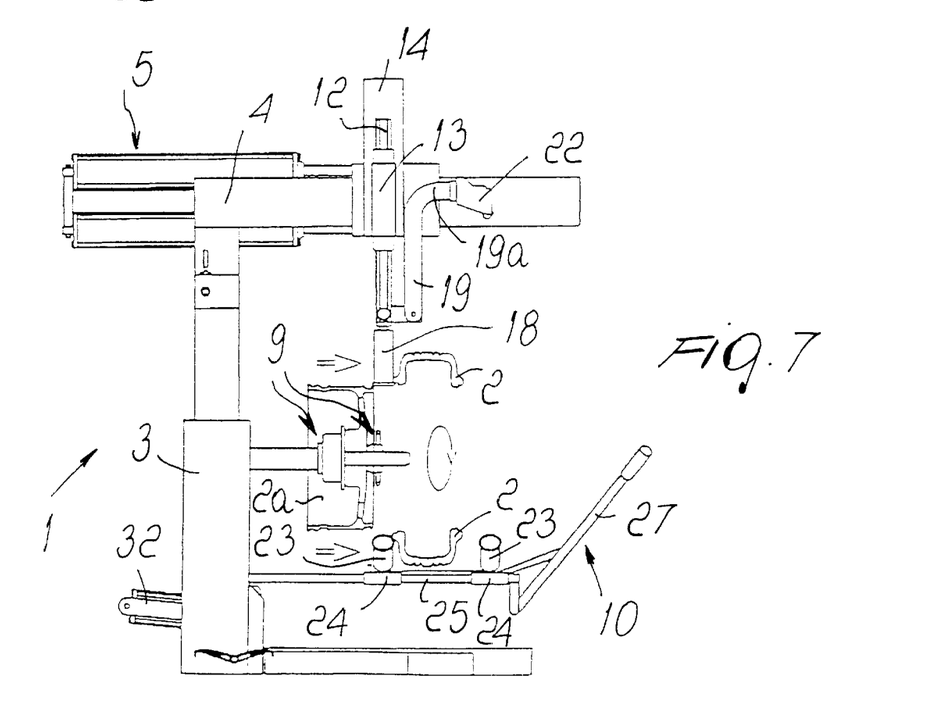
FIG. 7 is a view of the step for expelling the tire from the wheel rim.

By then moving the roller 18 onto the opposite side of the tire 2 with respect to the preceding side, the carriage 6 is slid outwards and the means 9 are turned; the roller 18 fully extracts the upper portion of the tire 2 from the wheel rim together with the ring that composes the special tire.

The lower portion of said tire is extracted by acting on the lever 27, pulling it outwards; this forces the innermost roller 23 into contact with the bead and, by maintaining the traction on the lever 27, both the tire 2 and the internal ring 2b made of elastomeric material are fully extracted.

For the reverse operation of fitting (FIGS. 13, 14 and 15), first the internal ring 2b is arranged on the wheel rim and then the wheel rim is inserted in the tire 2 through the larger diameter.

Figure 13:
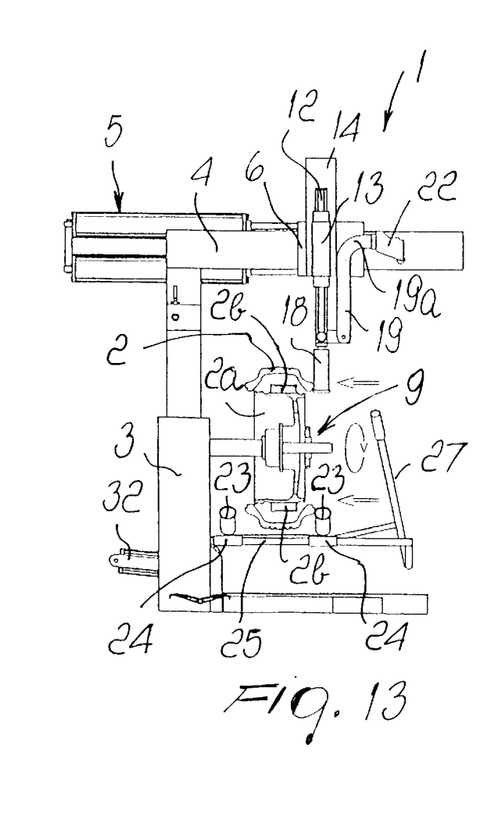
FIGS. 13, 14 and 15 are views of the same three successive steps for mounting a special tire.
Figure 14:
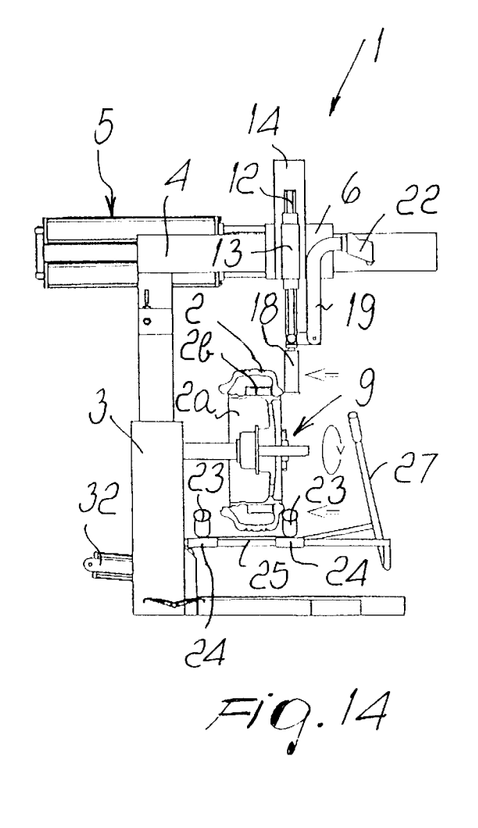
Figure 15:
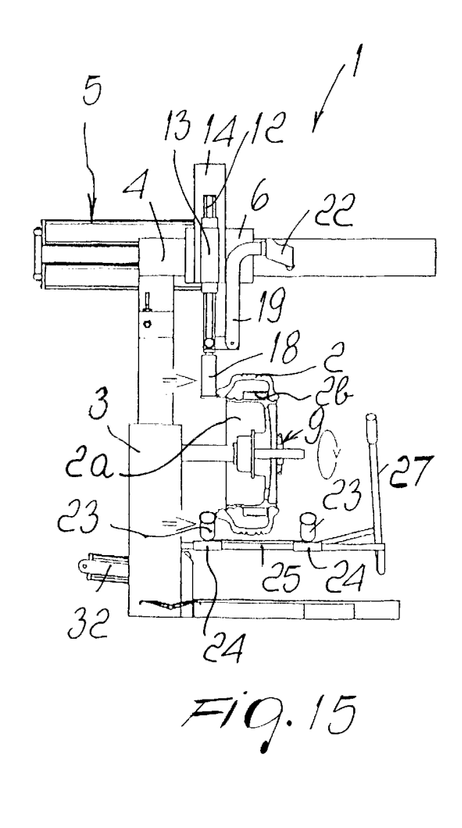

The assembly is then placed and fixed on the means 9 of the station 1 and the roller 18 is placed in contact with the bead that faces outwards, i.e. the bead that has the smaller diameter; simultaneously, by acting on the lever 27 and pushing it towardss the inside of the station 1, the roller 23 also is moved into contact with the lower portion of the bead.

Then the means 9 are turned and transverse thrust is activated simultaneously with the carriage 6 and with the lever 27: the bead thus actuated gradually moves beyond the edge of the wheel rim and arranges itself inside it.

The same transverse thrusting maneuver is then repeated for the opposite bead and the tire is thus mounted on its wheel rim.

For special tires 2, also, there is a step for seating after inflation; as done for conventional tires, the platform 31 is raised until the rollers 34 of the cradle 31 make contact with the tread; then the means 9 are turned and the pressure applied by the rollers seats the beads against the edges of the wheel rim.

The above-described mounting and removal operations can be performed also by using the auxiliary arm 36 (FIGS. 20, 21, 22, 23) provided with the guiding tool 37; in order to do this, after mounting and fixing a wheel on the means 9, the auxiliary arm 36 is moved from the inactive position to the active position, mutually aligning the head 40 and the receptacle 39; the former is inserted in the latter and is locked in position by lowering the guillotine 41.

The tool 37 is fitted, as in the other cases, on a rod 42 of its own which can slide in a sleeve 43 which is in turn fitted on a further rod 44 which is slidingly fitted in a sleeve 45; all these elements allow to move the tool 37 into the active position, inserted between the edge of the wheel rim and the bead, so that the bead, both in the case of a conventional tire and in the case of a special tire, actuated in advance by the plate 16, can, according to the situation, be guided out of the edge of the wheel rim or, on the contrary, be guided towardss the interior of the edge.

In practice it has been observed that the above-described invention achieves the intended aim and object.

The invention thus conceived is susceptible of numerous modifications and variations, all of which are within the scope of the same inventive concept.

All the details may further be replaced with other technically equivalent ones.

In practice, the materials employed, as well as the shapes and the dimensions, may be any according to requirements without thereby abandoning the scope of the protection of the appended claims.

The disclosures in Italian Patent Application No. MO99A000098 from which this application claims priority are incorporated herein by reference.

What is claimed is:

1. A multipurpose station for mounting on and removing from vehicle wheels conventional and special tires, comprising:

a turret-type frame;

a horizontal guiding cross-member cantilevering out from a top vertex of said frame;

a carriage which is supported on said cross-member so as to be movable back and forth thereon;

first and second tire changing means adapted to operate at tire beads for mounting and removing the tires from respective wheel rims of vehicle wheels, wherein said first tire changing means comprise a substantially vertical rod, a corresponding sleeve which is rigidly coupled to said carriage and in which said vertical rod is slidingly fitted, and first and second tools correspondingly usable on conventional and special tires, respectively, said first and second tools being alternately applicable at a lower end of said rod;

an actuator for actuating said carriage;

conventional supporting elements for rotatably supporting and clamping the wheels arranged at said frame at a substantially median vertical elevation thereof;

pusher means located at a downward region of said frame to co-operate with said tire changing means for mounting and removing the tires from the wheel rims; and lifting means, located at a downward region of said frame, for lifting the wheels vertically towards said conventional supporting elements, said lifting means comprising a cradle element which is movable horizontally with a sliding adjustable movement to apply pressure to the tire beads of mounted tires for seating thereof on sidewalls of the wheel rims.

2. The multipurpose station of claim 1, wherein said first tire changing means comprises a fluid-driven actuator for actuating said rod.

3. The multipurpose station of claim 2, wherein said turret-type frame is further provided with a lateral post which is joined, at upper and lower ends thereof, respectively to a corresponding end of said guiding cross-member and to a base post of said turret-type frame; with an auxiliary arm being articulated to said post so as to rotate along a horizontal path, said auxiliary arm comprising at its distal end relative to the post, a tool for guiding the beads of the tires and a centering element for centering said guiding tool in an active configuration.

4. The multipurpose station of claim 3, wherein said conventional supporting elements comprise a conventional rotating shaft, and wherein said centering element is constituted by a shaped receptacle, which is formed at a tip of a distal end of said auxiliary arm, by a complementarily shaped head which protrudes centrally from said conventional rotating shaft, said head being coaxially snugly insertable in said receptacle, and by retaining means provided for retaining the head in the receptacle in the active configuration of said guiding tool.

5. The multipurpose station of claim 4, wherein said retaining means are constituted by a transverse guillotine; by a corresponding through slot formed at the end of said auxiliary arm, and by a corresponding aligned groove which is formed perimetrically in said head, said guillotine being insertable through said slot in said groove.

6. The multipurpose station of claim 1, wherein said first tool for conventional tires is constituted by a shaped support which is articulated so as to rotate at the lower end of said rod, by a freely rotating plate, and by an opposite-facing extractor claw, said plate and claw being fitted on said support.

7. The multipurpose station of claim 1, wherein said second tool for special tires is constituted by at least one roller which is mounted so as to freely rotate at the lower end of said rod coaxial thereto, for operating in contact with a sidewall and bead region of the tires.

8. The multipurpose station of claim 7, wherein said pusher means are constituted by a horizontal guiding bar which is parallel to said guiding cross-member and protrudes from said turret-type frame below said supporting elements; by two sleeves which are slidingly engaged on said guiding bar; by two stems, each of which protrudes at right angles from a corresponding one of said sleeves; by two free rollers which are each fitted in a parallel configuration on a corresponding one of said stems, said sleeves being rotationally connected to each other by way of said guiding bar; and by adjustment means for adjusting mutual spacing of said sleeves.

9. The multipurpose station of claim 8, wherein said guiding bar has, at a free end thereof, an articulated handle for simultaneously turning said sleeves and said guiding bar and moving at least one of said sleeves in a horizontal direction.

10. The multipurpose station of claim 9, wherein said adjustment means for adjusting the mutual spacing of said sleeves are constituted by a pin provided so as to protrude from at least one of said sleeves, and by a plate, which is rigidly fitted to said handle and protrudes in a parallel arrangement with respect to said guiding bar, said plate being provided with a succession of aligned through sectors for alternative engagement with a corresponding said pin.

11. The multipurpose station of claim 8, wherein said guiding bar has, at a free end thereof, a fluid-driving actuator for simultaneously rotating said sleeves and said guiding bar and moving at least one of said sleeves in a horizontal direction.

12. A The multipurpose station of claim 8, further comprising probes for sensing tire width, which are associated with any of said sleeves and said free rollers.

13. The multipurpose station of claim 1, wherein said rod and said sleeve have a polygonal cross-sectional perimeter and are arranged so as to mutually interpenetrate for mutual engagement with a single degree of freedom.

14. The multipurpose station of claim 1, wherein said second tire changing means are constituted by an arm which is supported by said rod proximate to the lower end thereof and is articulated for rotation between an upward-facing inactive position and a downward-facing active position, said arm having a curved portion which, in said active position, is orientated towards said supporting elements; by a sleeve located at a tip end of said arm; by a second rod slidingly fitted in said sleeve; and by a shaped element for guiding the tire beads during fitting and removal, which is rigidly fitted at a lower end of said second rod.

15. The multipurpose station of claim 1, wherein said lifting means are constituted by a horizontal platform which is arranged below said supporting elements, is vertically aligned with said supporting means and is actuatable so as to move vertically parallel to itself, by an independent actuation unit for actuating said platform, and by said cradle which is arranged on an upper face of said platform so as to be horizontally slidingly adjustable to support and retain the tires and apply seating pressure thereto.

16. The multipurpose station of claim 15, wherein said cradle has, at its ends, respective transverse and parallel rollers which are supported freely between sidewalls of the cradle, in order to provide dynamic contact with the tires.

\* \* \* \* \*